United States Patent [19]
Persson et al.

[11] 3,879,259
[45] Apr. 22, 1975

[54] CORE MODULE FOR NUCLEAR REACTORS

[75] Inventors: Nils Olof Persson; Antti Suvanto; Lars Törnblom, all of Vasteras, Sweden; Ingvald Haga, Gjettum, Norway

[73] Assignee: Aktiebolaget ASEA-ATOM, Vasteros, Sweden; by said Persson, Suvanto and Törnblom

[22] Filed: May 15, 1973

[21] Appl. No.: 360,540

[30] Foreign Application Priority Data
May 17, 1972 Sweden.............................. 6422/72

[52] U.S. Cl.................... 176/36 R; 176/50; 176/78
[51] Int. Cl.............................................. G21c 7/08
[58] Field of Search................ 176/36 R, 50, 68, 78

[56] References Cited
UNITED STATES PATENTS

| | | | |
|---|---|---|---|
| 3,481,832 | 12/1969 | Rickert | 176/78 |
| 3,501,377 | 3/1970 | Germer | 176/50 |
| 3,713,971 | 1/1973 | Van Santen et al. | 176/50 |

*Primary Examiner*—Samuel Feinberg

[57] ABSTRACT

A core module for nuclear reactors includes a core support grid having hollow tubes extending upwardly therefrom and fuel assemblies mounted on the upper ends of said tubes with their interiors in communication with the interiors of the tubes. There are a number of control rods around the periphery of each module which are connected by a single control rod yoke, the control rods being guided on the outsides of the core support tubes. The yoke is connected to the core rod drive.

2 Claims, 6 Drawing Figures

PATENTED APR 22 1975 3,879,259

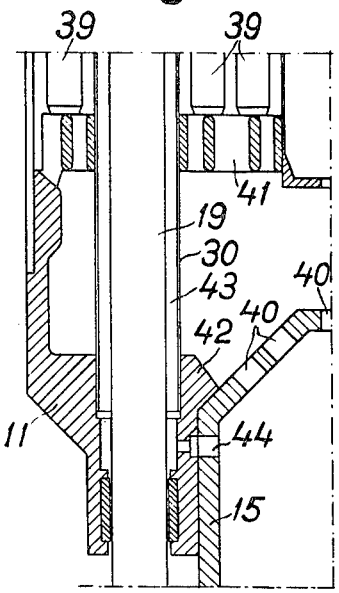
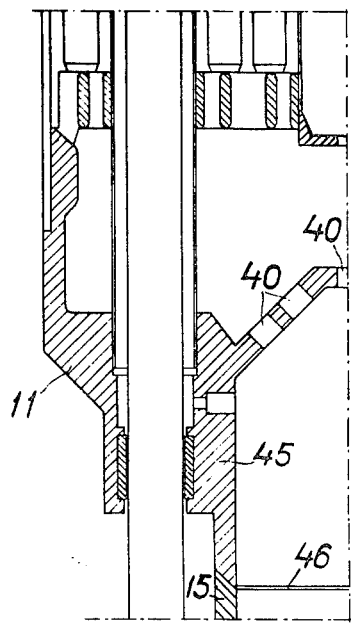
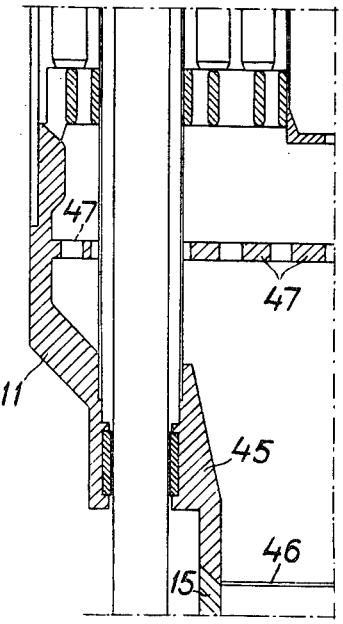

CORE MODULE FOR NUCLEAR REACTORS

BACKGROUND OF THE INVENTION

1. Field of the Invention

The present invention relates to a core module for a nuclear reactor comprising fuel assemblies with an associated control rod unit and a control drive connected to the control rod unit.

2. The Prior Art

In known embodiments of core support means for the fuel assemblies of a nuclear reactor inside the reactor vessel, four fuel assemblies rest on a common core support grid which is welded to the guide tubes of the control rods, these guide tubes being supported on the control rod connection pieces at the bottom of the vessel. The coolant for the fuel assemblies in this case is led on the outside of the control rod guide tubes, through valves in the core support grid, to the inlet of the assembly. Because the core support grid must allow space for the erection of fuel assemblies, their inlet throttling valves and the passage of control rods, it becomes complicated in shape and weak in mechanical strength.

Furthermore, it is necessary in a reactor core for the control rod (and particularly the control rod yoke for finger control rods) and the control rod shaft to be easily exchangeable.

In order to achieve sufficient hydromechanical stability in a fuel element forming part of a fuel assembly in a reactor of the light water type, the outlet of the coolant for the fuel element must be throttled. In a conventional boiling water reactor which is provided with cruciform control rods between the fuel assemblies, this throttling means can be placed in the core support grid for the fuel assemblies. The fuel elements will not therefore be subjected to the flow and pressure forces caused by the inlet throttling. In a reactor provided with finger control rods running in guide tubes, the throttling means for the fuel element should be placed on the down-flow side of the inlet to the control rod guide tubes so that the control rod pin will be sufficiently cooled. However, if the inlet control is placed in the fuel element, the lifting force will be so great that a complicated locking mechanism is required to fix the position of the fuel element.

SUMMARY OF THE INVENTION

With the help of the core module according to the invention, the problems described above can be easily solved and the core module according to the invention is characterized by the provision of a core support grid from which there extend upwardly a plurality of core support tubes each of which in turn supports a fuel assembly comprised of a plurality of fuel elements, the interior of the fuel assembly communicating with the hollow interior of the supporting tube. A plurality of control rods are mounted for movement through hollow tubes associated with the fuel assemblies, which tubes may also communicate with the interiors of the core support tubes. The control rods are all connected to a yoke which is in turn operatively connected to the control drive. The control rods are guided by rollers at their lower ends on the outsides of the core support tubes.

BRIEF DESCRIPTION OF THE DRAWINGS

The invention will be further described with reference to the accompanying drawings in which.

DESCRIPTION OF THE PREFERRED EMBODIMENTS

Figure 1:
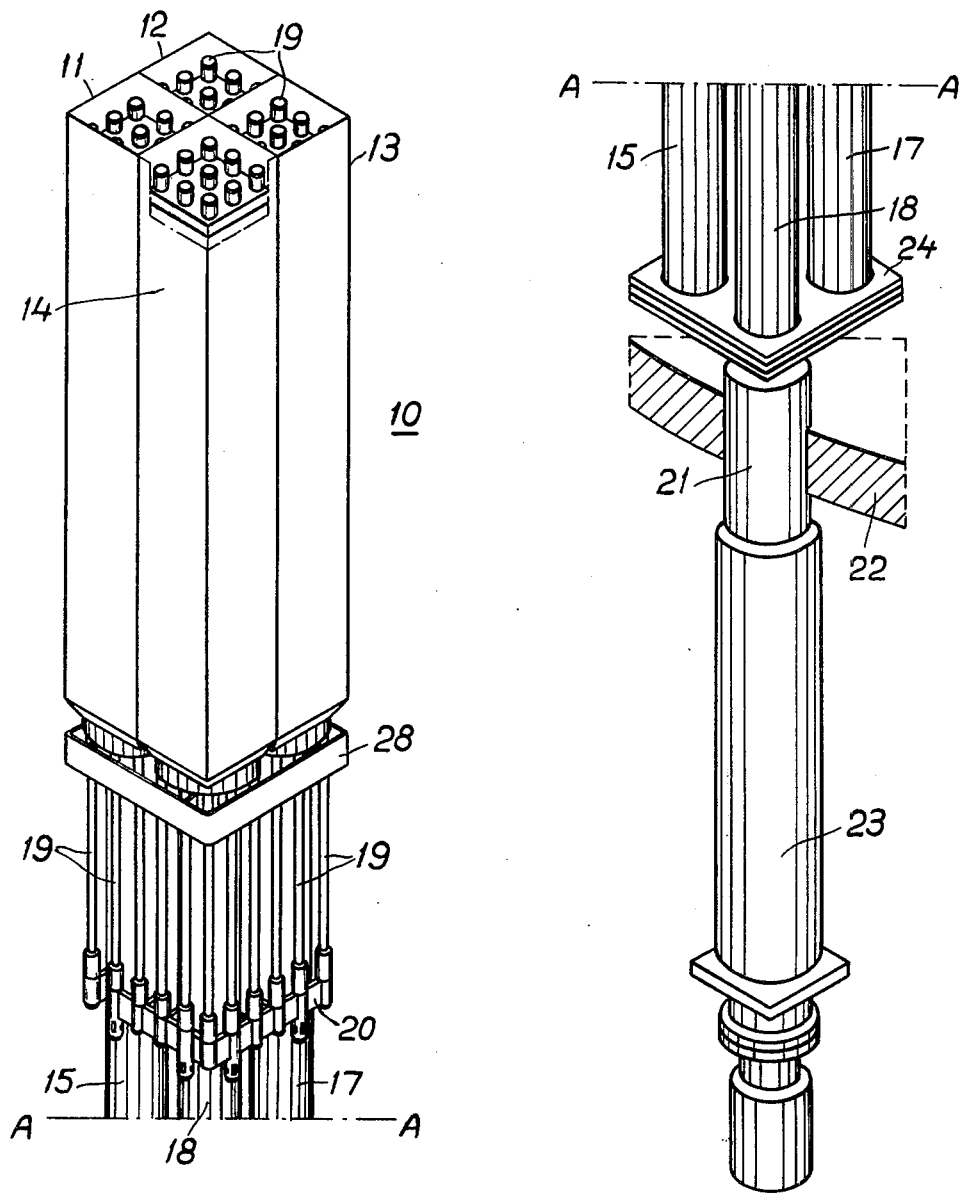
FIG. 1 shows a core module according to the invention.

FIG. 1 shows a core module according to the invention. This figure is divided into two sections by the line A—A.

The core module 10 consists of fuel assemblies 11-14, resting on core support tubes 15-18. Control rod pins 19 are insertable in the fuel assemblies 11-14. The control rod pins 19 are anchored to a control rod yoke 20 which is displaceable along the core support tubes 15-18.

A control rod shaft 21 is arranged for the control rod yoke 20, this shaft running through the bottom 22 of the reactor vessel and being connected to the control drive 23 of the control rod.

The core support tubes 15-18 are joined together at the base by means of a core support grid 24.

Figure 2:
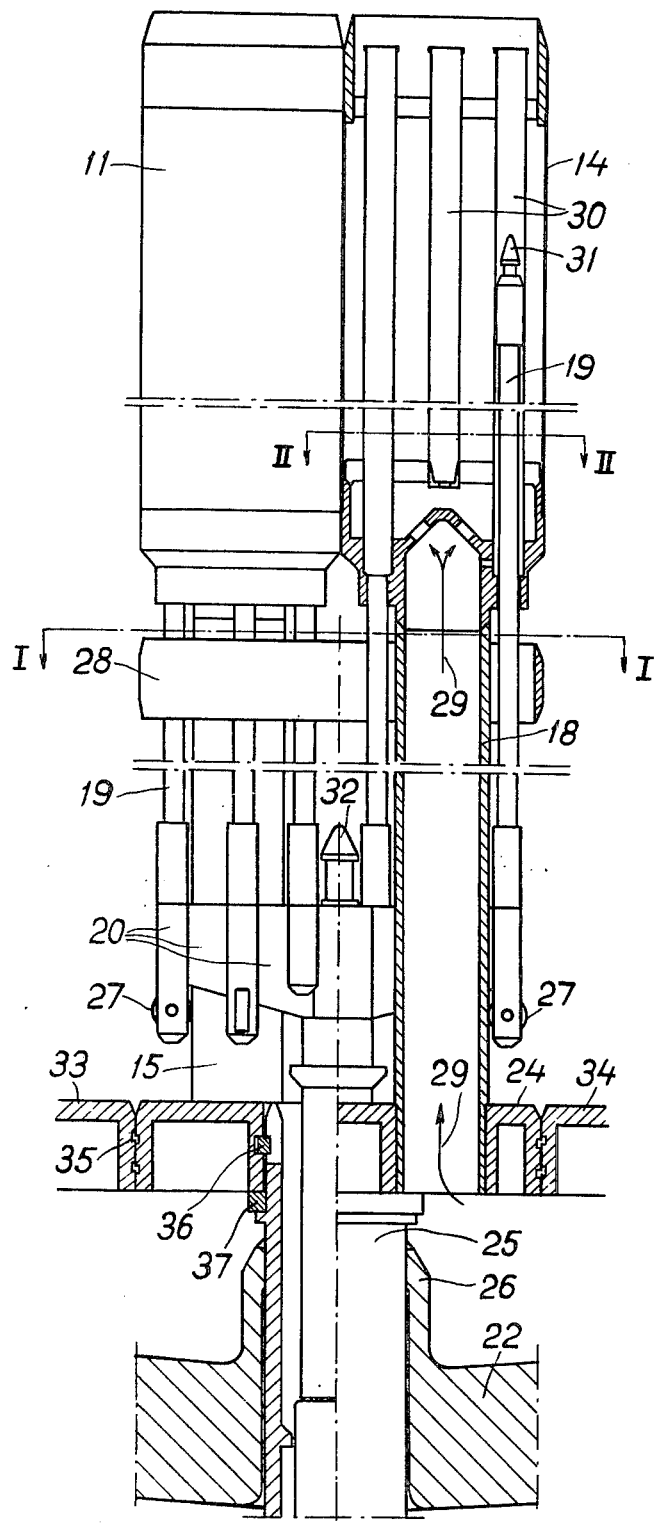
FIG. 2 shows a section through the part of the core module according to FIG. 1 which is located inside the reactor vessel.

FIG. 2 shows a side view, partially in section, of two fuel assemblies 11 and 14 and the core support grid 24. The control drive tube 25 for the control rod runs through the bottom 22 of the reactor vessel, and the control drive tube 25 is suspended from and rests on a piece 26 projecting from the bottom 22 of the vessel.

The core support grid 24 rests in turn on the control drive tube 25.

The vertical core support tubes 15 and 18 are applied on and secured to the core support grid 24. Between and around the core support tubes is the control rod yoke 20 with its control rod pins 19.

The control rod yoke 20 is suitably provided with guide rollers 27 arranged against the core support tubes so that the core support tubes act as guide rails for the control rod yoke 20.

At the upper ends, or if necessary at other levels, the core support tubes 15-18 are held together by means of a support frame 28.

The necessary throttling means for the coolant to the fuel assemblies 11-14 are arranged in the upper part of the core support tubes 15-18 since, contrary to previously known arrangements, the coolant is led up through the core support tubes 15-18. See the arrows 29 in FIG. 2.

The control rod pins 19 run inside the fuel assemblies 11-14 in guide tubes 30 and are provided with lifting members 31 at their upper ends. The fuel assemblies 11-14 can thus be lifted with or without control rods.

When dismantling control rod units, the control rod yoke 20 and the upper part of the control rod shaft 21 are removed upwardly by a central lifting device 32 provided for the control rod. The upper part of the control rod shaft 21 is locked to the lower part of the control rod shaft 21 by means of a bayonet mounting (not shown), so that the control rod shaft 21 must be twisted with respect to the control rod yoke 20 in order to release the upper part of the control rod shaft 21. This is made possible by a mechanical arrangement, not shown.

The core support grid 24 is sealed with respect to other core support grids 33 and 34 with the help of a labyrinth packing 35 or the like.

Locking rings 36 and seals 37 are arranged between the core support grid 24 and the control drive tube 25.

Figure 3:
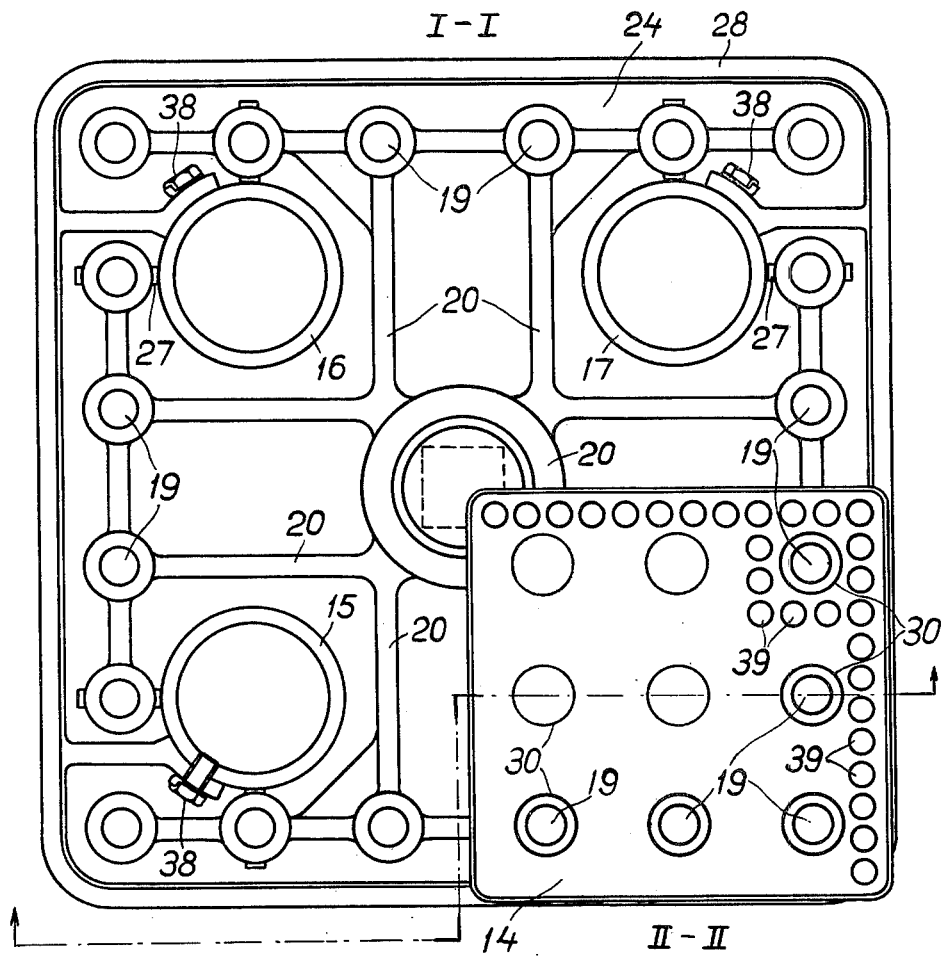
FIG. 3 shows a section partly on the line I—I of FIG. 2 and partly on the line II—II of FIG. 2, and FIGS. 4, 5 and 6 show various embodiments of the inlet throttling means for the fuel assemblies.

FIG. 3 shows in section on the line I—I of FIG. 2 how the core support tubes 15–18 are joined to a core support grid 24 by means of bolts 38. Section I—I also shows the control rod yoke 20 with control rod pins 19.

The lower right corner of FIG. 3 is a section on the line II—II of FIG. 2, which shows a section through a fuel assembly 14 where the distribution of the control rod pins 19 is shown in relation to the fuel elements 39 (only a few of the fuel elements 39 are shown).

The distribution between the control rod pins 12 and fuel elements 39 shown here is extremely advantageous as it gives a good shape factor since each control rod pin 19 then is associated with the same number of fuel elements 39.

FIGS. 4–6 show various embodiments of the inlet throttling means for the fuel assemblies.

FIG. 4 shows in section one alternative where the inlet throttling means 40 is placed in the core support tube 15 of the fuel assembly 11 comprising fuel elements 39 resting on a bottom plate 41. The fuel assembly 11 rests by means of a boss 42 on the core support tube 15. The pressure strain caused by circulation of the coolant will thus be entirely on the upper part of the core support tube 15. The inlet to the gap 43 between guide tube 30 and control rod pin 19 is provided by a throttled channel connection 44.

FIG. 5 shows the same throttling means as FIG. 4 with the exception that the upper part 45 of the core support tube 15 is separated from the rest of the tube 15 by means of a section 46. The upper part 45 is attached to the fuel assembly 11. This means that the pressure strain is transferred entirely to the fuel assembly 11.

FIG. 6 shows yet another alternative, where the tube 15 is divided into two parts at 46. However, the throttling means consists of throttling disc 47 arranged horizontally in the fuel assembly 11 and integral therewith.

We claim:

1. A core module for a nuclear reactor having a control rod drive, said module comprising a plurality of fuel assemblies, a plurality of core support tubes, each fuel assembly resting upon one of the core support tubes, a core support grid to which the core support tubes are attached, a plurality of control rods associated with the fuel assemblies, a first means for operatively connecting all of the control rods to the control rod drive, means to supply fluid to said core support tubes, and second means connecting the interiors of said core support tubes to the interiors of said fuel assemblies, said second means including throttled openings, said first connecting means including a member operatively engaging the control rods, and third means guiding said member on the outsides of the core support tubes.

2. A core module as claimed in claim 1, which includes control rod tubes passing through the fuel assemblies, said control rods being guided in said control rod tubes, and fourth means connecting the interiors of said control rod tubes to the interiors of said support tubes.

* * * * *